(12) United States Patent
Hsu

(10) Patent No.: US 6,252,830 B1
(45) Date of Patent: Jun. 26, 2001

(54) REAL-TIME COMPRESSING AND DECOMPRESSING APPARATUS FOR RECORDING AND REPRODUCING MULTI-SOUNDTRACK VOICE DATA

(76) Inventor: William Hsu, No. 17, Alley 38, Lane 173, Science Park Road, Hsin Chu (TW)

( * ) Notice: Subject to any disclaimer, the term of this patent is extended or adjusted under 35 U.S.C. 154(b) by 0 days.

(21) Appl. No.: 09/418,497

(22) Filed: Oct. 15, 1999

(51) Int. Cl.$^7$ .................................................. G11B 21/12
(52) U.S. Cl. .................................................. 369/25
(58) Field of Search .............................. 369/25, 27, 32, 369/33, 1, 2, 7, 12, 19; 704/500, 208, 268, 270

(56) References Cited

U.S. PATENT DOCUMENTS

| | | | |
|---|---|---|---|
| 5,477,511 | * | 12/1995 | Englehardt ............................ 369/25 |
| 5,481,645 | * | 1/1996 | Bertino et al. ........................ 704/270 |
| 5,502,694 | * | 3/1996 | Kwoh et al. ........................... 369/25 |
| 5,806,038 | * | 9/1998 | Huang et al. ......................... 704/268 |
| 5,842,123 | * | 11/1998 | Hamamoto et al. .................. 455/412 |
| 6,016,472 | * | 1/2000 | Ali ......................................... 704/500 |
| 6,038,199 | * | 3/2000 | Pawlowski et al. .................... 369/25 |
| 6,061,306 | * | 5/2000 | Buchheim ............................... 369/2 |
| 6,064,955 | * | 5/2000 | Huang et al. ......................... 704/208 |
| 6,175,822 | * | 1/2001 | Jones .................................... 704/270 |

* cited by examiner

Primary Examiner—Tan Dinh
(74) Attorney, Agent, or Firm—Rosenberg, Klein & Lee

(57) ABSTRACT

A real-time compressing and decompressing apparatus for recording and reproducing multi-soundtrack voice data is disclosed. The apparatus comprises a real-time decompressing module for reproducing digital voice; a pre-module for real-time compressing digital voice; a long-term primary and secondary power control module; a controllable working-frequency adjusting module; a linking module for supplying power; and a digital voice memory module. Therefore, the digital voice is not distorted, the voice data is read directly from computer network and audio input unit and real-time compressed to store in memory. Moreover, the decompression operation is performed simultaneously with the compression operation to real-time playback voice data. The data can be sustained for long time. The present invention provides primary power for main operation and secondary power for memory storage, and uses SDRAM in place of flash memory to reduce cost.

9 Claims, 3 Drawing Sheets

FIG. 3

REAL-TIME COMPRESSING AND DECOMPRESSING APPARATUS FOR RECORDING AND REPRODUCING MULTI-SOUNDTRACK VOICE DATA

FIELD OF THE INVENTION

The present invention relates to a real-time compressing and decompressing apparatus for recording and reproducing multi-soundtrack voice data, especially to a real-time apparatus for decompressing and reproducing the compressed multi-soundtrack voice data download from computer network or fetched from replaceable memory card, and compressing and recording the voice data to replaceable memory card without using computer.

BACKGROUND OF THE INVENTION

The music compressed in MP3 (MPEG Audio Layer-3) format becomes more and more popular. MP3 is a data compression/decompression standard subordinate to MPEG (movie picture experts group) by which the audio can be compressed to 1/10 or 1/12 storage amount. For example, the MP3 audio CD can store about 100 songs of ordinary playing time. However, the MP3 audio CD is generally reproduced by computer rather than CD player. Therefore, the reproducing apparatus and method for MP3 music are under extensive research for easier use.

FIG. 1 shows the system block according to a prior art data compression method 100a. The prior art data compression method 100a comprises steps of reading two adjacent data in the content table of compact disk, which represent the absolute playing time of compact disk and are stored in the content table in a first carry format; subtracting the two adjacent data in the content table to obtain a relative data representing the relative playing time of the compact disk; converting the relative data to a plurality of values in a second carry format; storing the non-zero ones of the plurality of values and indicating the byte number of non-zero values by a flag.

However, the above mentioned prior art has following drawbacks:

1. The recording and reproducing operations can not be performed simultaneously due to lack of real-time decompressing step.
2. The data is read from compact disk and can not be read from other source such as computer network or audio means.
3. The compressed data is stored in the volatile data memory such as RAM of the micro-controller, the data preservation is limited by power.

FIG. 2 shows the system block diagram of another prior art wherein a hand-held and flash memory based voice recording/reproducing device for language learning is disclosed. The hand-held voice recording/reproducing device comprises a CPU 1a, an input unit 2a connected to the CPU 1a, a liquid crystal display unit 3a, a system memory 4a, a database memory 5a, an audio output 6a, a first playback key, a DSP unit 7a, and a A/D converter 8a. The user input the command thereof through the input unit 2a such that the CPU 1a reads an object text data from the database memory 5a. Afterward, the object text data is displayed on the liquid crystal display unit 3a. The first playback key is pressed to generate an object voice data reading signal by which an object voice data is read and processed by the A/D DSP unit 7a and the converter 8a, and then enhanced through the audio output 6a. The prior art hand-held voice recording/reproducing device is characterized in that the A/D converter 8a is further connected to a microphone 9a, and the CPU 1a is electrically connected to a separable flash memory 13a, a recording key and a second playback key. The recording key provides a recording control signal to the CPU 1a such that the microphone 9a receives the analog voice data corresponding to the object voice data. The analog voice data is converted to a digital voice data and compressed by the DSP unit 7a, and then stored in the flash memory 13a. The second playback key provides a voice reading signal to the CPU 1a such that the voice data stored in the flash memory 13a is decompressed by the DSP unit 7a and then converted to an audio voice. The audio voice is sent to the audio output 6a for enhancing.

However, the above-mentioned voice recording/reproducing device for language learning has following drawbacks:

1. The power supply 14 thereof has no long-term primary and secondary power control module. Therefore, the above-mentioned voice recording/reproducing device has only primary power supply for liquid crystal display and does not have secondary power supply for memory.
2. The flash memory 13a used in the above-mentioned voice recording/reproducing device is costly and the device has not the ability to charge the primary and secondary power supply when using the flash memory.
3. The voice signal can not be transmitted through the path from the CPU 1a to the flash memory 13a.
4. The system memory 4a and the database memory 5a are provided for read only data, thus being not rewritable. It is not suitable for the application of real-time compressing and decompressing voice data.
5. The input unit 2a does not have expansion control code unit, the mode of input means is limited.
6. The above-mentioned voice recording/reproducing device uses liquid crystal display unit 3a only, and does not use other display device such as plasma display.

It is the object of the present invention to provide a real-time compressing and decompressing apparatus for recording and reproducing multi-soundtrack voice data, which can overcome the above mentioned problems.

To achieve the object, the present invention provides a real-time compressing and decompressing apparatus for recording and reproducing multi-soundtrack voice data. The real-time compressing and decompressing apparatus comprises a real-time decompressing module for reproducing digital voice; a pre-module for real-time compressing digital voice; a long-term primary and secondary power control module; a controllable working-frequency adjusting module; a linking module for supplying power; and a digital voice memory module. Therefore, the digital voice is not distorted, the voice data is read directly from computer network and audio input unit and real-time compressed to store in memory. Moreover, the decompression operation is performed simultaneously with the compression operation to real-time playback voice data. The data can be sustained for long time. The present invention provides primary power for main operation and secondary power for memory storage, and uses SDRAM in place of flash memory to reduce cost.

The various objects and advantages of the present invention will be more readily understood from the following detailed description when read in conjunction with the appended drawing, in which:

DETAILED DESCRIPTION OF THE PREFERRED EMBODIMENT

Figure 1:
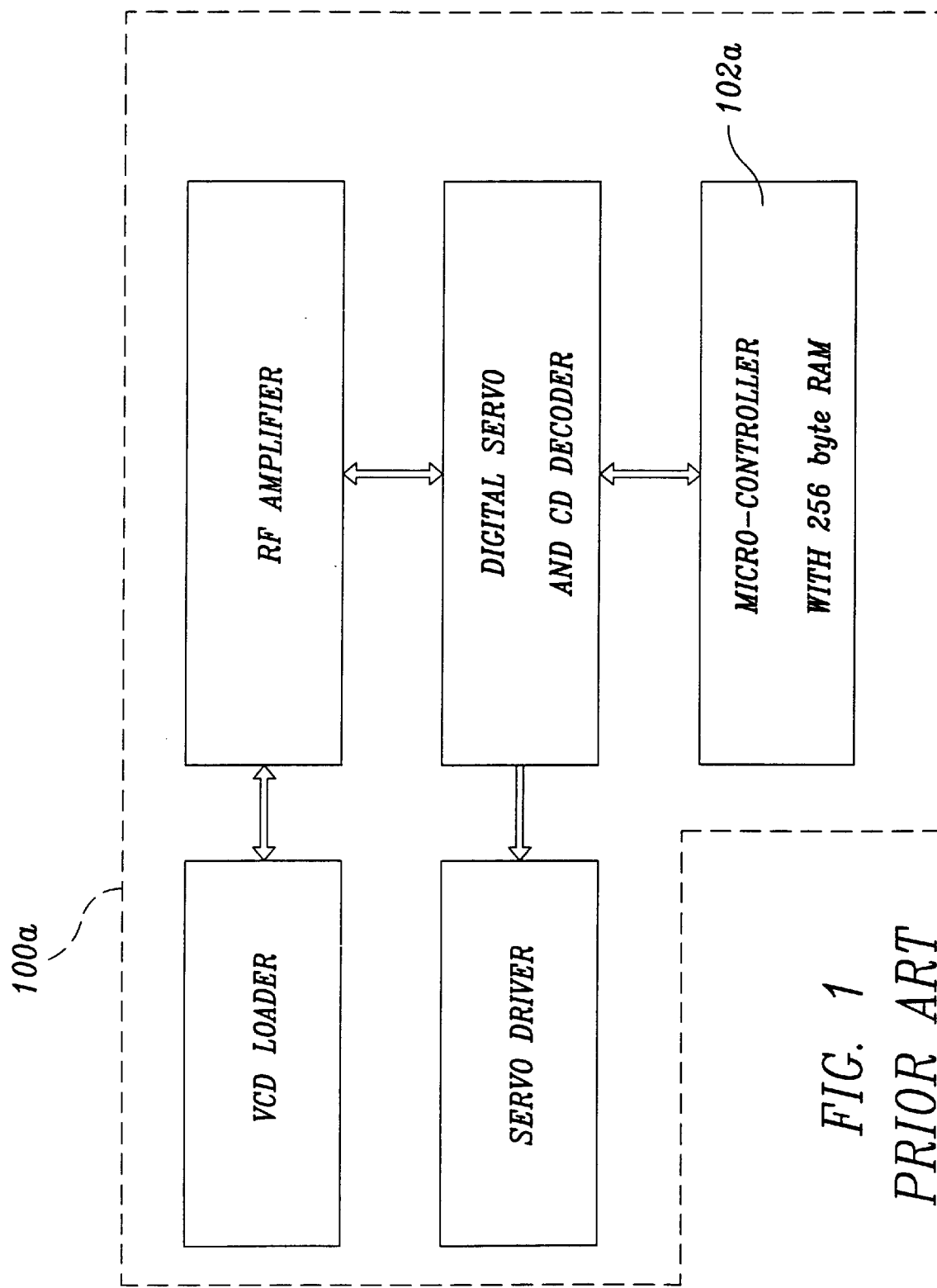
FIG. 1 shows the system block according to a prior art data compression method.
Figure 2:
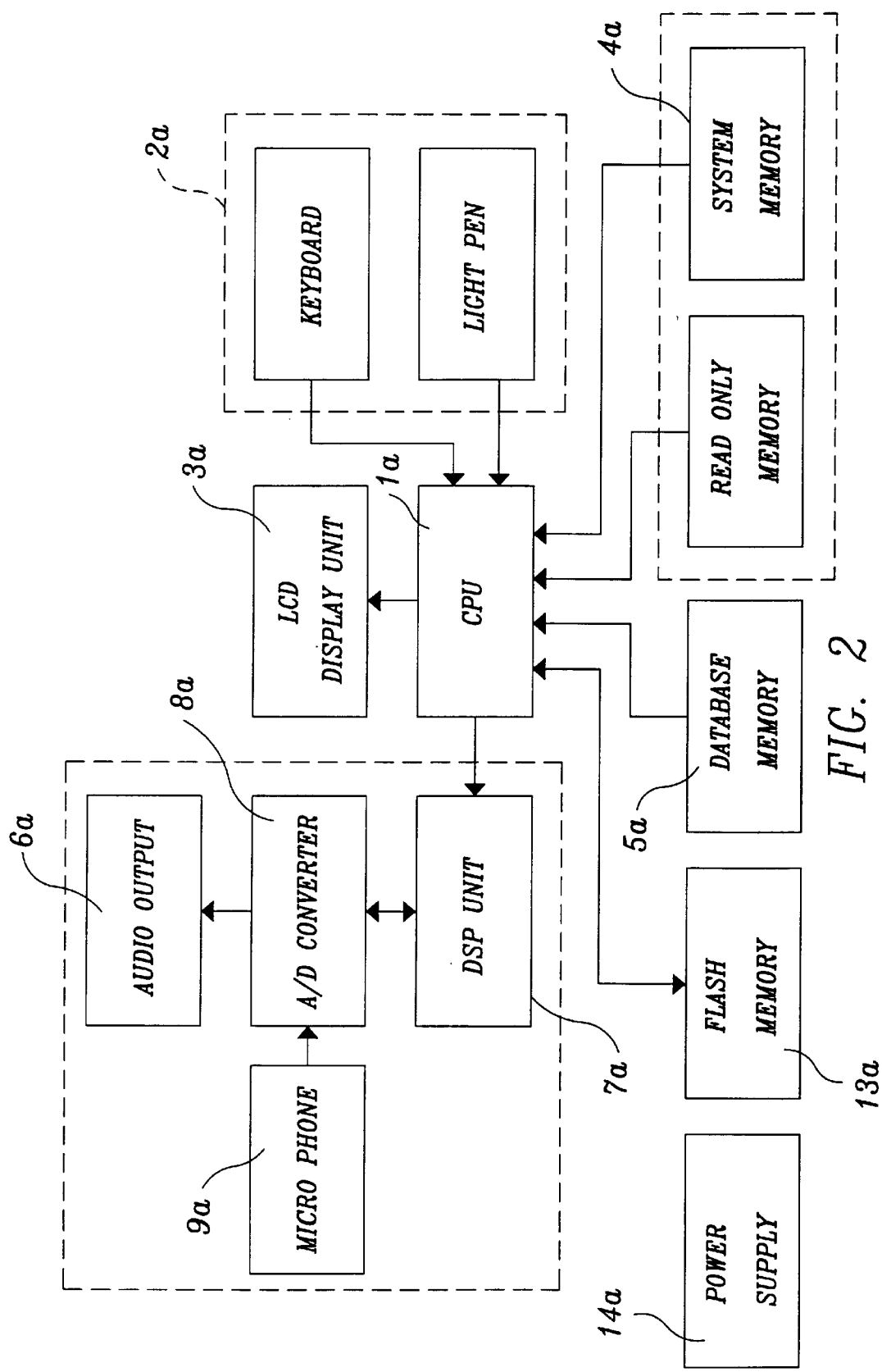
FIG. 2 shows the block diagram of another prior art wherein a hand-held and flash memory based voice recording/reproducing device for language learning is disclosed.
Figure 3:
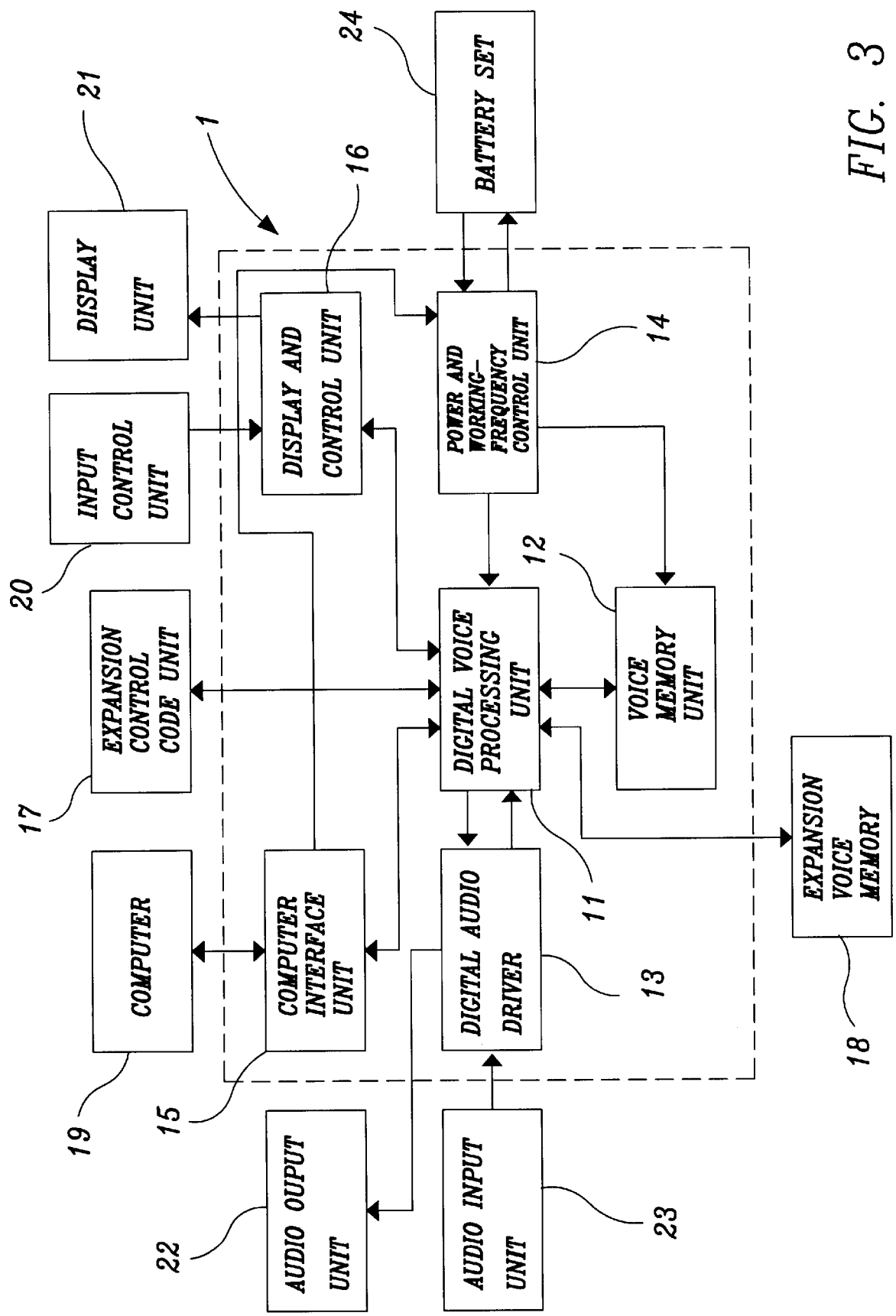
FIG. 3 is the block diagram of the preferred embodiment of the present invention.

The present invention is intended to provide a real-time compressing and decompressing apparatus 1 for recording and reproducing multi-soundtrack voice data. As shown in this figure, the real-time compressing and decompressing apparatus 1 comprises a real-time decompressing module for reproducing digital voice; a pre-module for real-time compressing digital voice; a long-term primary and secondary power control module; a controllable working-frequency adjusting module; a linking module for supplying power; and a digital voice memory module.

The real-time decompressing module for reproducing digital voice comprises a digital voice processing unit 11 and an internally-connected digital audio driver 13. The digital voice processing unit 11 is the control center of the inventive real-time compressing and decompressing apparatus 1. The digital voice processing unit 11 provides the function of A/D conversion and D/A conversion, and real-time compressing and decompressing operations. Moreover, the digital voice processing unit 11 is connected to an expansion control code unit 17 for providing human-machine interface. The digital audio driver 13 is functioned to convert the real-time decompressed digital voice to analog voice and amplify the analog voice to compensate signal attenuation, thus driving an audio output unit 22. The number of the audio output unit 22 can be larger than one. By using the inventive real-time compressing and decompressing apparatus 1, multi-soundtrack voice can be reproduced without using a computer 19.

The pre-module for real-time compressing digital voice also comprises a digital voice processing unit 11 and an internally-connected digital audio driver 13. The digital voice processing unit 11 is connected to an expansion control code unit 17 for providing human-machine interface. The digital audio driver 13 is functioned to real-time compress the analog voice sent from the audio input unit to the digital voice processing unit and is connected to at least one audio input unit 23. The data format of the audio input unit can be MP3, MP4, real-time encryption or EPP/USB.

The long-term primary and secondary power control module comprises a power and working-frequency control unit 14, a digital voice processing unit 11 and a voice memory unit 12. The working-frequency control unit 14 is internally-connected to the digital voice processing unit 11 and the voice memory unit 12. The power and working-frequency control unit 14 is functioned to adjust the supplied power of the external battery set 24 and the working frequency of the computer to values suitable for the digital voice processing unit 11 and the voice memory unit 12. Moreover, the working-frequency control unit 14 is connected to at least one battery set 24 to provide primary power and the function of data sustainment of the voice memory unit 12 after power off.

The controllable working-frequency adjusting module comprises a working-frequency control unit 14 and an internally-connected voice memory unit 12. The controllable working-frequency adjusting module can reduce the working frequency of the inventive real-time compressing and decompressing apparatus 1 as in a sleep mode to reduce the power consumption. Moreover, the controllable working-frequency adjusting module can turn off the idle unit and module.

The linking module for supplying power comprises a computer interface unit 15 and an internally-connected working-frequency control unit 14. The computer interface unit 15 is connected to a computer 19 and is functioned to enable the digital voice processing unit 11 and the computer 19 to share the voice data. Moreover, the computer interface unit 15 can transmit the power of the computer 19 to the working-frequency control unit 14 to charge the digital voice processing unit 11 and the voice memory unit 12, and charge the battery set 24 when sharing the voice data. Moreover, the working-frequency control unit 14 is connected to at least one battery such that the battery 24 can be charged when upload or download data. The computer interface unit 15 can be parallel input, serial input, MPIB, or BCD.

The digital voice memory module comprises a digital voice processing unit 11 and an internally-connected voice memory unit 12. The voice memory unit 12 is functioned to store the voice data compressed by the digital voice processing unit 11. Moreover, the digital voice processing unit 11 is connected to an expansion voice memory 18. The expansion voice memory 18 and the voice memory unit 12 are preferably SDRAM.

Moreover, the real-time compressing and decompressing apparatus 1 further comprises a display and input control module. The display and input control module comprises a digital voice processing unit 11 and an internally-connected display and control unit 20. The display and input control module sequentially receives the command from the input control unit 20 and sends the command to the digital voice processing unit 11. Moreover, the display and input control module receives the command of the digital voice processing unit 11 and interprets each display and control command such that the audio output unit 22, the audio input unit 23, the computer 19 and the display unit 21 can function according to the interpreted command. The input control unit 20 can be several playback keys and recording keys. The display unit 21 can be liquid crystal display, illuminance display or plasma display.

To sum up, the present invention has following advantages:

1. The digital voice is not distorted.
 2. The voice data is read directly from computer network and audio input unit and real-time compressed to store in memory.
 3. The decompression operation is performed simultaneously with the compression operation to real-time playback voice data.
 4. The data can be sustained for long time.
 5. The present invention provides primary power for main operation and secondary power for memory storage.
 6. The present invention uses SDRAM in place of flash memory to reduce cost.
 7. The battery can be charged during download data.
 8. The present invention uses rewritable memory and does not use a read-only memory.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A real-time compressing and decompressing apparatus for recording and reproducing multi-soundtrack voice data comprising:

a digital voice processing unit as the control center of the real-time compressing and decompressing apparatus, said digital voice processing unit providing the function of A/D conversion and D/A conversion, and real-time compressing and decompressing operations;

a digital audio driver connected to said digital voice processing unit and functioned to convert the real-time decompressed digital voice to analog voice and amplify the analog voice to compensate signal attenuation, thus driving an audio output unit; and real-time compress the analog voice sent from an audio input unit to said digital voice processing unit;

a voice memory unit connected to said digital voice processing unit and functioned to store the voice data compressed by said digital voice processing unit;

a power and working-frequency control unit connected to said digital voice processing unit and voice memory unit, and functioned to adjust the supplied power of an external battery set and the working frequency of a computer to values suitable for said digital voice processing unit and said voice memory unit;

a computer interface unit connected to said digital voice processing unit and said power and working-frequency control unit, said computer interface unit functioned to enable said digital voice processing unit and said computer to share the voice data, said computer interface unit transmitting the power of said computer to said working-frequency control unit to charge said digital voice processing unit and said voice memory unit, and charging said battery set when sharing the voice data; and a display and input control module connected to said digital voice processing unit and sequentially receiving the command from an input control unit and sending the command to said digital voice processing unit, said display and input control module receiving the command of said digital voice processing unit and interpreting each display and control command such that said audio output unit, said audio input unit, said computer and said display unit can function according to the interpreted command.

2. The real-time compressing and decompressing apparatus for recording and reproducing multi-soundtrack voice data as in claim 1, said digital voice processing unit further comprises an expansion control code unit for providing human-machine interface.

3. The real-time compressing and decompressing apparatus for recording and reproducing multi-soundtrack voice data as in claim 1, wherein said digital audio driver is connected to at least one external audio output unit whereby multi-soundtrack voice can be reproduced without using a computer.

4. The real-time compressing and decompressing apparatus for recording and reproducing multi-soundtrack voice data as in claim 1, wherein said digital audio driver is connected to at least one external audio input unit, the data format of said audio input unit can be MP3, MP4, real-time encryption or EPP/USB.

5. The real-time compressing and decompressing apparatus for recording and reproducing multi-soundtrack voice data as in claim 1, wherein said power and working-frequency control unit is connected to at least one battery set to provide primary power and the function of data sustainment of said voice memory unit after power off.

6. The real-time compressing and decompressing apparatus for recording and reproducing multi-soundtrack voice data as in claim 1, wherein said digital voice processing unit is connected to an expansion voice memory, said expansion voice memory and said voice memory unit being preferably SDRAM.

7. The real-time compressing and decompressing apparatus for recording and reproducing multi-soundtrack voice data as in claim 1, wherein said input control unit can be several playback keys and recording keys.

8. The real-time compressing and decompressing apparatus for recording and reproducing multi-soundtrack voice data as in claim 1, wherein said display unit can be liquid crystal display, illuminance display or plasma display.

9. The real-time compressing and decompressing apparatus for recording and reproducing multi-soundtrack voice data as in claim 1, wherein said computer interface unit can be parallel input, serial input, MPIB, or BCD.

* * * * *